United States Patent
Yorkston

(10) Patent No.: US 12,111,905 B2
(45) Date of Patent: Oct. 8, 2024

(54) WIRELESS ACCESS TAG SYSTEM AND METHOD

(71) Applicant: Info Wise Limited, Wanchai (HK)

(72) Inventor: Simon Yorkston, Paris (FR)

(73) Assignee: Info Wise Limited, Wanchai (HK)

( * ) Notice: Subject to any disclaimer, the term of this patent is extended or adjusted under 35 U.S.C. 154(b) by 850 days.

(21) Appl. No.: 17/057,358

(22) PCT Filed: May 22, 2019

(86) PCT No.: PCT/AU2019/050501
§ 371 (c)(1),
(2) Date: Nov. 20, 2020

(87) PCT Pub. No.: WO2019/222804
PCT Pub. Date: Nov. 28, 2019

(65) Prior Publication Data
US 2021/0192036 A1    Jun. 24, 2021

(30) Foreign Application Priority Data

May 22, 2018   (AU) .............................. 2018901798

(51) Int. Cl.
*G06F 21/35* (2013.01)
*G06K 7/10* (2006.01)
(Continued)

(52) U.S. Cl.
CPC ......... *G06F 21/35* (2013.01); *G06K 7/10297* (2013.01); *G06K 19/0725* (2013.01);
(Continued)

(58) Field of Classification Search
CPC ................ G06F 21/35; G06K 19/0725; G06K 7/10297; G07C 2009/00769; G07C 9/00174
See application file for complete search history.

(56) References Cited

U.S. PATENT DOCUMENTS 9,032,498 B1 * 5/2015 Ben Ayed ............... G06F 21/35
726/9
9,402,148 B1 * 7/2016 Tan ......................... H04W 4/80
(Continued)

OTHER PUBLICATIONS

PCT/AU2019/050501 International Search Report mailed Aug. 5, 2019; 5 pages.
PCT/AU2019/050501 Written Opinion mailed Aug. 5, 2019; 6 pages.

*Primary Examiner* — Gary S Gracia
(74) *Attorney, Agent, or Firm* — Cozen O'Connor

(57) ABSTRACT

A wireless access method, device and system is disclosed that enables remote dynamic configuration of wireless devices which emulate wireless tags, while maintaining compatibility with prior art access systems. This enables wireless tags to be shared in a manner that allows copies of the tags to remain synchronised with each other. The system includes a remote server, configured to selectively provide tag data to the wireless devices to enable the wireless devices to emulate the one or more wireless tags using the selectively provided tag data. In use, the wireless tags are configured to first retrieve tag data from the remote server, and subsequently emulate one or more wireless tags according to the retrieved tag data.

20 Claims, 6 Drawing Sheets

(51) Int. Cl.
*G06K 19/07* (2006.01)
*G07C 9/00* (2020.01)
(52) U.S. Cl.
CPC ............... *G07C 9/00174* (2013.01); *G07C 2009/00769* (2013.01)

(56) References Cited

U.S. PATENT DOCUMENTS

| | | | |
|---|---|---|---|
| 9,419,687 B1* | 8/2016 | Buchheit | H04B 5/72 |
| 9,870,660 B1 | 1/2018 | Patterson | |
| 10,164,766 B1* | 12/2018 | Hung | H03L 7/099 |
| 11,023,396 B2* | 6/2021 | Moon | G06F 12/0804 |
| 11,521,213 B2* | 12/2022 | Rule | H04L 9/3228 |
| 11,836,484 B1* | 12/2023 | Hensley | G06F 8/65 |
| 2006/0052055 A1* | 3/2006 | Rowse | G06K 7/10237 455/41.1 |
| 2009/0171786 A1* | 7/2009 | Kuo | G06Q 30/02 705/14.73 |
| 2009/0243810 A1* | 10/2009 | Pendlebury | G07F 7/1008 340/10.51 |
| 2011/0241838 A1* | 10/2011 | Wischmeyer | G06F 21/35 340/10.1 |
| 2013/0247117 A1* | 9/2013 | Yamada | H04B 5/72 340/12.5 |
| 2014/0008429 A1* | 1/2014 | Wang | G06Q 30/018 235/375 |
| 2014/0015638 A1* | 1/2014 | Cochran | G06K 7/10297 340/5.65 |
| 2014/0249937 A1* | 9/2014 | McNally | H04M 3/4938 705/15 |
| 2014/0303808 A1* | 10/2014 | Sargent | G06F 16/24556 701/1 |
| 2014/0359505 A1* | 12/2014 | Cisler | G06F 16/168 715/810 |
| 2016/0226997 A1* | 8/2016 | Zeng | H04L 67/60 |
| 2016/0358391 A1* | 12/2016 | Drako | G06K 7/1408 |
| 2017/0048773 A1* | 2/2017 | Miao | H04W 48/18 |
| 2017/0070877 A1* | 3/2017 | Shi | H04W 8/183 |
| 2017/0094628 A1* | 3/2017 | Miao | H04W 36/08 |
| 2017/0127217 A1* | 5/2017 | Miao | H04W 76/15 |
| 2017/0139782 A1* | 5/2017 | Chen | G06F 16/27 |
| 2017/0243195 A1* | 8/2017 | Xing | G06Q 20/0855 |
| 2017/0311161 A1* | 10/2017 | Kuenzi | G07C 9/00904 |
| 2018/0000001 A1* | 1/2018 | Bassett | A01B 61/044 |
| 2018/0005227 A1* | 1/2018 | Sandeløv | G06Q 20/20 |
| 2018/0006801 A1* | 1/2018 | Hung | H04N 21/25808 |
| 2018/0096238 A1* | 4/2018 | Buller | G06Q 20/045 |
| 2018/0248722 A1* | 8/2018 | Wicaksana | H04L 27/0014 |
| 2018/0268175 A1* | 9/2018 | Rietzler | G06Q 10/08 |
| 2018/0270733 A1* | 9/2018 | Tohzaka | H04W 72/04 |
| 2018/0308040 A1* | 10/2018 | Trivelpiece | G06Q 10/087 |
| 2019/0082363 A1* | 3/2019 | Park | H04W 36/0079 |
| 2019/0377914 A1* | 12/2019 | Horchak | G06K 7/10386 |
| 2020/0082930 A1* | 3/2020 | De Francesco | G16H 10/60 |
| 2021/0142013 A1* | 5/2021 | Kumar | G06K 7/10158 |
| 2021/0192036 A1* | 6/2021 | Yorkston | G06K 7/10297 |
| 2022/0343089 A1* | 10/2022 | Turner | G06K 7/10475 |
| 2022/0383308 A1* | 12/2022 | Wang | G07F 7/0833 |

* cited by examiner

WIRELESS ACCESS TAG SYSTEM AND METHOD

TECHNICAL FIELD

The present invention relates to wireless access tags.

BACKGROUND ART

Traditionally, physical locks and keys were used to restrict access to buildings and other locations. In particular, a lock was typically placed on a door, which restricted access through the door unless a corresponding key was used.

Keys and locks were generally paired based upon a physical shape of the key. In particular, a barrel of the lock was configured to operate based upon the physical shape of the key. As such, a key could readily be copied by duplicating the shape of the key.

More recently, wireless access cards have gained popularity, as they enable more refined access control. For example, wireless access cards may be used to provide access to a building during business hours, but not after hours, and may also be used to log access to the building. Such refined access control is generally not possible with traditional keys alone.

However, a problem with wireless access cards is that they generally only hold one set of authentication data, meaning that multiple wireless access cards are required to authenticate against multiple access systems.

Furthermore, while wireless access cards that are programmable are known, updating, erasing or programming prior art wireless access cards requires physical access to the card, which is generally inconvenient. In the instance of lost or stolen cards, the wireless access card cannot be remotely erased, potentially creating a security risk. Furthermore, if multiple copies of a wireless access card exist, and the data of one card is updated, all other copies of the card will generally fail until they are also manually updated.

Certain RFID emulation devices exist, which enable emulation of multiple wireless access cards. However, these emulation devices generally mimic physical wireless access cards, and as such are subject to the same problems as physical wireless access cards, as outlined above.

As such, there is clearly a need for improved wireless access tag systems and methods.

It will be clearly understood that, if a prior art publication is referred to herein, this reference does not constitute an admission that the publication forms part of the common general knowledge in the art in Australia or in any other country.

SUMMARY OF INVENTION

The present invention is directed to wireless access tag systems and methods, which may at least partially overcome at least one of the abovementioned disadvantages or provide the consumer with a useful or commercial choice.

With the foregoing in view, the present invention in one form, resides broadly in a wireless access system including:
 a plurality of wireless devices, dynamically configurable to emulate as one or more wireless access tags; and
 a remote server, configured to selectively provide tag data to the wireless devices to enable the wireless devices to emulate the one or more wireless tags using the selectively provided tag data,
wherein, in use, the wireless tags are configured to first retrieve tag data from the remote server, and subsequently emulate one or more wireless tags according to the retrieved tag data.

Preferably, the wireless devices are configured to retrieve the tag data prior to each emulation of the wireless tag. The wireless devices may be configured to retrieve the tag data each time the device is turned on. As such, the wireless devices are able to ensure the tag data is up to date.

Preferably, the tag data includes a tag identifier. Preferably, the tag data includes one or more keys (or similar data) for use in authentication. The tag data may also include tag configuration data, such as frequency or protocol to be used.

Preferably, the devices are configured to emulate the one or more wireless tags for use with one or more receivers, wherein the devices are configured to retrieve the tag data independently of the receivers.

The receiver may be a legacy receiver, wherein emulation functionality is provided using the devices and the remote server. As such, the system may provide a cost effective means for upgrading existing access control systems.

The wireless devices may coexist with legacy wireless access tags. In such case, the devices and the legacy wireless access tags may be indistinguishable in their interaction with the receiver.

The plurality of wireless devices may include first and second devices including the same tag data. As such, the system enables duplication of tags to be provided on different wireless devices.

Preferably, a first wireless device may be configured to share tag data relating to one or more tags with a second wireless device.

Each of the wireless devices may be configured to upload updated tag data, such as tag data received from a receiver in response to authentication with a receiver, to the remote server, to enable synchronisation of the updated tag data across multiple devices.

The remote server may be configured to selectively remove tag data from one or more wireless devices. The remote server may remove the tag data by overwriting the tag data with invalid data. As such, time-limited access may be provided to a wireless device.

Each wireless device may be configurable to store tag data corresponding to a plurality of tags, wherein each set of tag data is selectable to emulate a corresponding wireless tag.

The wireless device may be configured to automatically select a set of tag data of a plurality of sets of tag data. The wireless device may be configured to automatically select the set of tag data based on location. The wireless device may be configured to automatically select the set of tag data based on a detected field of a receiver in proximity to the wireless device.

Each of the wireless devices may be further configured to upload logging data relating to tag use. The logging data may include a time, date, frequency, and/or location of the tag use.

Each of the wireless devices may be further configured to upload location data. This may be useful in localising lost or stolen badges.

The remote server may be configured to remotely update tag data on one or more receivers, and automatically update a plurality of devices according to the updated tag data. Such configuration enables efficient tag management of a large number of tags.

The wireless devices may be configured to emulate RFID tags.

A wireless device of the plurality of wireless devices may include first tag data, configured to operate at a first frequency or protocol, and second tag data, configured to operate at a second frequency or protocol that is different to the first frequency or protocol.

In another form, the invention resides broadly in a wireless access method, including:

retrieving, at a first wireless device of a plurality of wireless devices, tag data from a remote server; and in response to retrieving the first tag data, emulating, at the first wireless device, one or more wireless tags according to the retrieved tag data;

wherein the remote server is configured to selectively provide tag data to the plurality of wireless devices to enable the wireless devices to emulate one or more wireless tags corresponding to the selectively provided tag data.

In yet another form, the invention resides broadly in a wireless access device, configured to retrieve tag data from a remote server; and in response to retrieving the first tag data, emulate one or more wireless tags according to the retrieved tag data.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
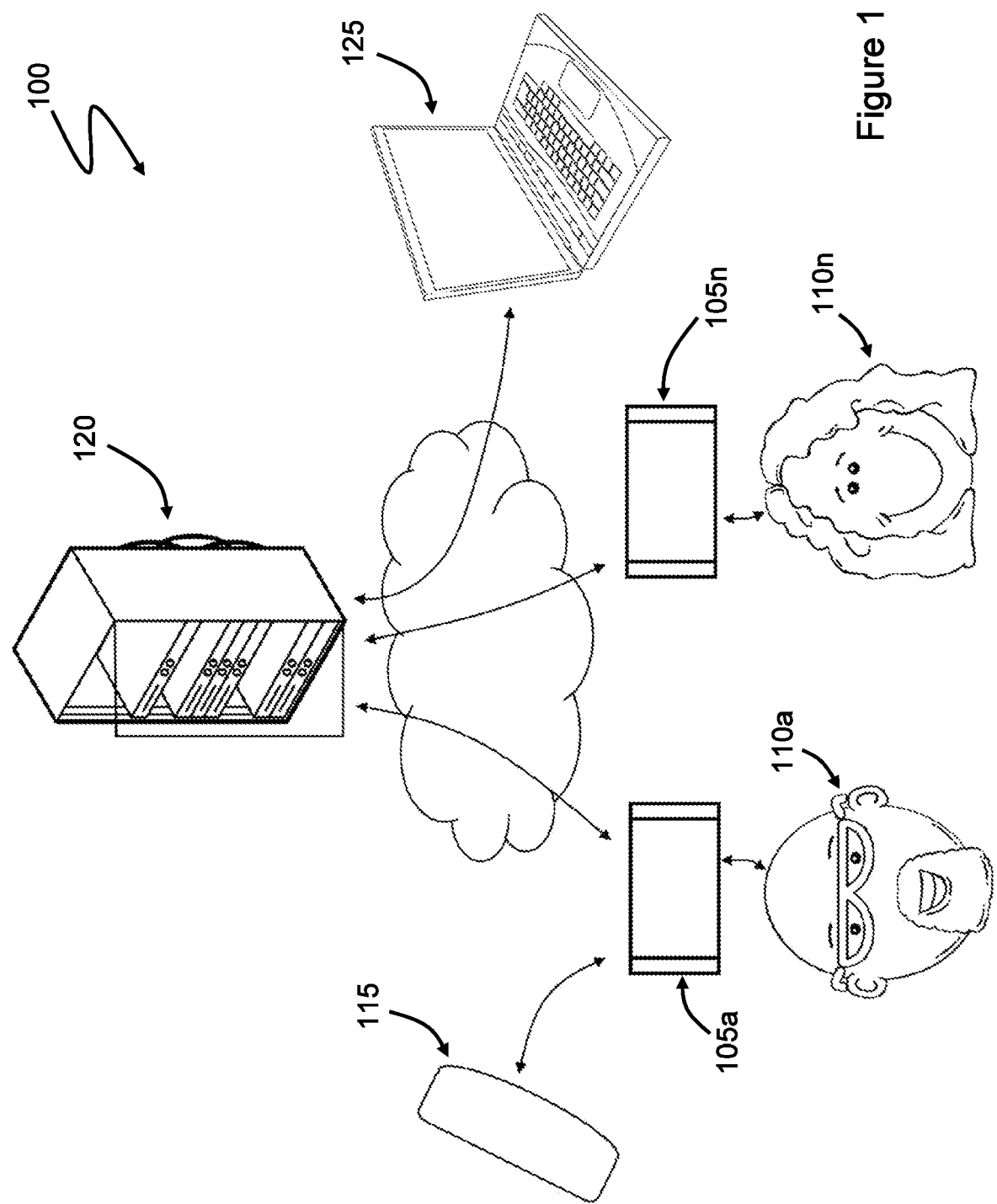
FIG. 1 illustrates a wireless access tag system, according to an embodiment of the present invention.

FIG. 1 illustrates a wireless access tag system 100, according to an embodiment of the present invention. The wireless access tag system 100 enables remote configuration of wireless devices (which emulate (and thus function as) one or more wireless tags), while maintaining compatibility with prior art access systems. This in turn enables wireless tags to be shared, for example, in a manner that allows copies of the tags to remain synchronised with each other, and enables tags to be automatically updated when data of a tag is updated as part of an authentication process, for example.

The wireless access tag system 100 includes a plurality of wireless access devices 105a, 105n, which enable a plurality of users 110a, 110n access control, for example to a building or other secure area. As illustrated in FIG. 1, the first user 110a may use the first wireless access device 105a to access a secure area by engaging (e.g. "tapping") the wireless access device 105a against a reader 115 associated therewith, much like what is done with a traditional wireless access (e.g. RFID) tag.

The reader 115 is advantageously a legacy wireless access reader, and as such, the system 100 is able to operate with legacy wireless access systems, and provide additional functionality thereto. Examples of protocols and frequencies which the reader 115 (and thus the wireless access devices 105a-105n) may operate according to include, for example, the following:

13.56 MHz—Mifare (1k Classic, 4k Classic, Plus);
13.56 MHz—Mifare NTAG20X;
13.56 MHz—Mifare Ultralight, Ultralight C, Ultralight EV1;
13.56 MHz—Mifare DESFire, DESFire EV1;
13.56 MHz—HID iCLASS;
125 kHz—HID ProxKey (I, II, II), HID ProxPass (I, II); and
125 kHz—EM4XXX and compatible, T55XX and compatible.

The wireless access devices 105a-105n include a wireless connectivity module, which enables communication between each of the wireless access devices 105a-105n and a remote server 120.

The remote server 120 is able to remotely configure or update each of the wireless access devices 105a-105n, including by adding or removing a wireless access tag, changing data associated with a wireless access tag, or updating a configuration associated with a wireless access tag, such as a frequency of operation or protocol used. This enables the system 100 to remove one or more of the abovementioned limitations associated with prior art access control systems, without having to replace the access control system, and thus enable functionality to be added whilst remaining compatible with existing access control systems.

The devices 105a-105n can communicate with the remote server 120 via any suitable communications means, including by a Global System for Mobile communications (GSM) or other cellular data connection, a Bluetooth Low Energy (BLE) connection, such as Bluetooth via paired connection with another device (e.g. a mobile phone, computer, etc), or a Radio Frequency (RF) connection, such as Sigfox or LoRA.

Figure 2:
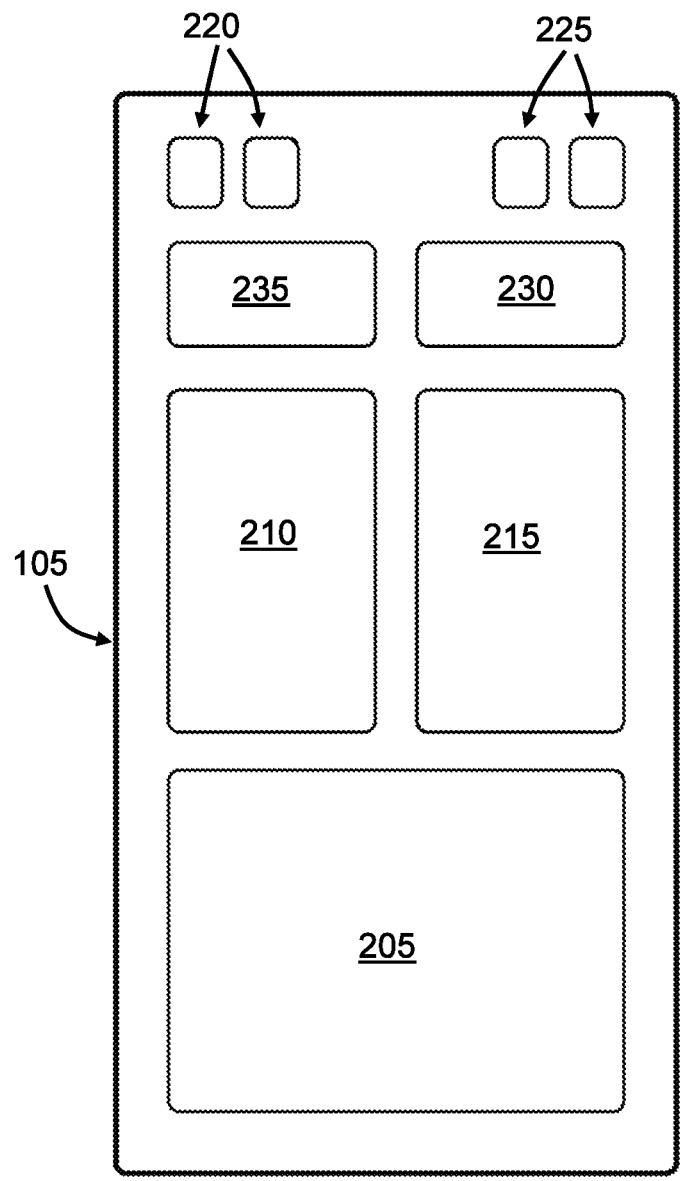
FIG. 2 illustrates a schematic of a wireless access device of the system of FIG. 1, according to an embodiment of the present invention.

FIG. 2 illustrates a schematic of the wireless access device 105, according to an embodiment of the present invention. The wireless access device 105 may be similar or identical to the wireless access devices 105a-105n of the system 100 of FIG. 1.

The wireless access device 105 includes a power source 205, such as a battery, which powers the wireless access device 105, a microcontroller 210, which controls the wireless access device 105, and a connectivity module 215, which enables the wireless access device 105 to communicate with an external server (such as the server 120 of the system 100).

The wireless access device 105 further includes a plurality of tactile inputs in the form of buttons 220, which enable a user of the wireless access device 105 to interact therewith.

Visual indicators 225, such as light emitting diodes, on the wireless access device 105 provide feedback to the user in relation to said interactions, and/or can be used to convey other information to the user.

In use, the user may power on the wireless access device 105, and activate the emulation of the wireless access device 105 using the buttons 220. In such case, data associated with a tag is retrieved from a memory 230, and is used to configure the associated tag on the wireless access device 105. Once the tag is configured, the wireless access device 105 utilises an antenna system 235, coupled to the microcontroller 210, to emulate the wireless access tag.

In some embodiments, further functionality may be provided by the buttons, such as an ability to select a tag from a plurality of possible tags (e.g. by toggling between tags). The skilled addressee will, however, readily appreciate that any suitable means may be used to configure the wireless access device 105 by the user.

As mentioned above, the connectivity module 215 also enables the wireless access device 105 to communicate with a remote server, such as the server 120. Such communication is bidirectional, which allows the wireless access device 105 to communicate updated tag data to the server (e.g. updated data tag data received in an authentication process), and the server to communicate data to the wireless access device 105 (e.g. new or updated tag data received from another wireless access device 105).

Figure 3:
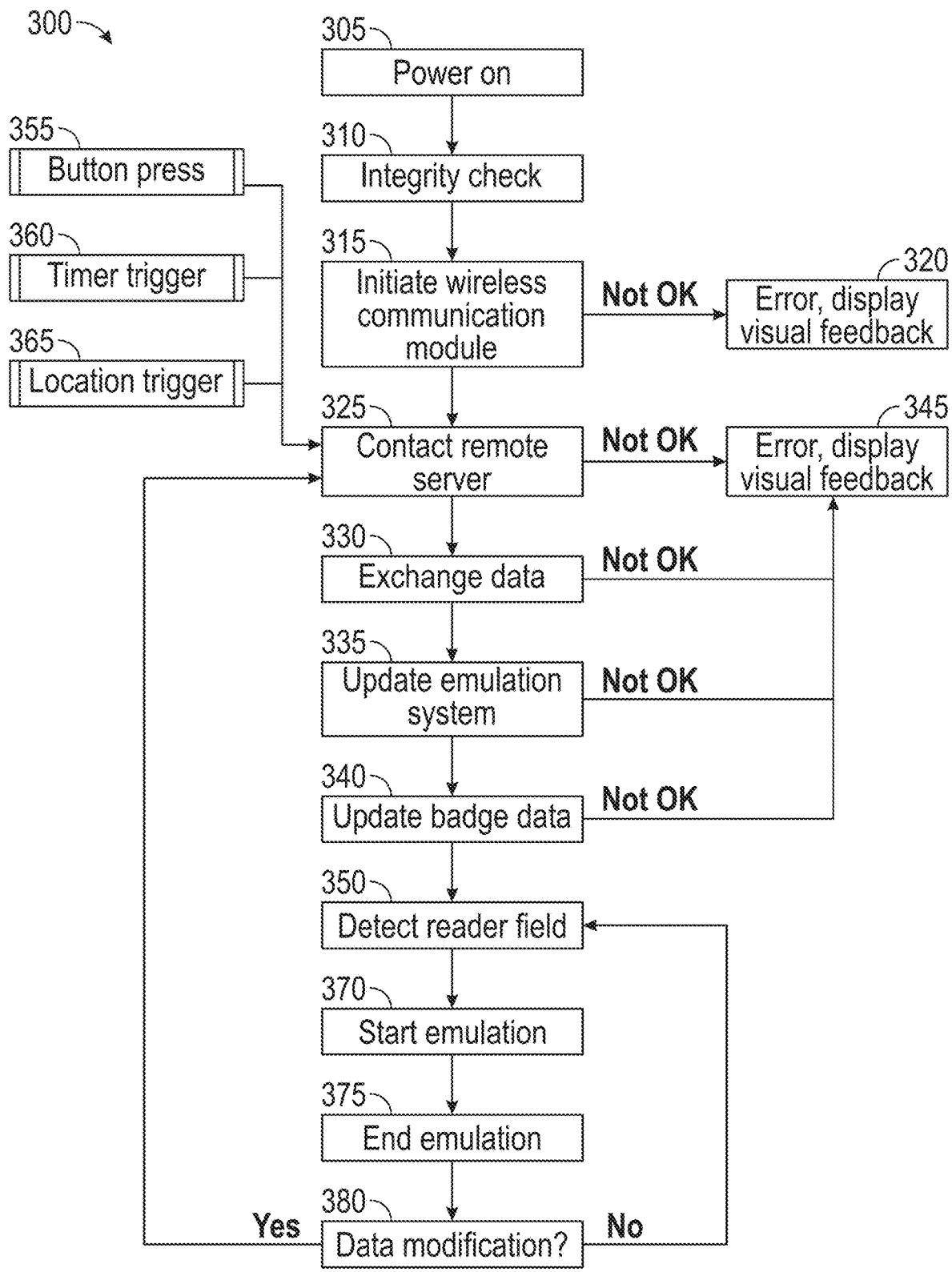
FIG. 3 illustrates a wireless access device method, according to an embodiment of the present invention.

FIG. 3 illustrates a wireless access device method 300, according to an embodiment of the present invention. The method 300 may be performed on each of the devices 105a-105n, and/or on the device 105.

Initially, in step 305, the device is powered on. As outlined above, this may be performed in response to a user pressing a button on the device, or by any other means.

After the device powers up, an integrity check is performed on the device in step 310. The integrity check may include determining connectivity between the microcontroller, connectivity module, antenna systems, memory, and or other components of the device.

At step 315, the wireless communication module of the device is initiated. This step may include synchronising one or more clocks of the wireless communications module, or any other steps necessary to initiate communication using the wireless communication module.

If any error is detected in steps 310 or 315, an error signal is displayed visually to the user in step 320. The error signal may comprise illumination of a specific error light, blinking of a light, or a change in colour of a light, to indicate the error.

Otherwise, i.e. if there is no error detected, the remote server is contacted in step 325. This may be achieved using any protocol or any combination of protocols, as will be appreciated by the skilled addressee.

At step 330, data is exchanged with the server. In particular, any new data that has been received by the device is uploaded to the server (such that it can be shared with other devices), and any new data on the server (e.g. from other devices) is downloaded to the device. This step ensures that data is synchronised between copies of tags, for example, and enables the devices to be remotely updated. In this regard, timestamps may be used to identify new data.

At step 335, the emulation system is updated, as required, based upon the received data. As an illustrative example, the emulation system may be updated to operate according to new software, which may implement different protocols of features. As such, this feature enables new functionality to be added to the system, as required.

At step 340, badge (tag) data is updated, as required, based upon the received data. As an illustrative example, the badge data may comprise one or more keys (or similar data) for use in authentication, and these keys (or data) may be updated if they have changed.

If any of steps 325-340 fail, an error signal is displayed in step 345. The error signal may be similar or identical to the error signal mentioned in step 320.

At step 350, the device is configured to detect a reader field. By detecting the reader field, the device is able to determine what frequency the reader operates, and select a corresponding tag accordingly.

Once the reader field is detected, emulation in that frequency and according to the tag is performed in step 370. Emulation ends in step 375 (e.g. after a timeout or successful authentication), and if data was modified during authentication, the method continues at step 325 where the remote server is contacted to update the data, as outlined above. This ensures that any other devices sharing this tag data are also updated with the change in data. If the data was not modified, the method may continue in step 350 (and thus be further used for authentication).

Step 325 may also be performed upon interaction from the user (as illustrated by a button press in step 355), be triggered by a timer (as illustrated by a timer trigger in step 360), or be triggered by location (e.g. as illustrated by a location trigger in step 365). Similarly, step 325 may be triggered upon an error, including an authorisation error.

One such use case where location-based triggering is particularly useful is when a user has access to multiple properties using different tags. Upon their arrival at a property, the device may automatically determine the appropriate tag to load based on the location, contact the remote server 325 automatically to update the tag, and emulate the appropriate tag, allowing for seamless and rapid authentication.

While not illustrated, after a time out window, for example, the device may power off automatically to save battery resources.

Figure 4B:
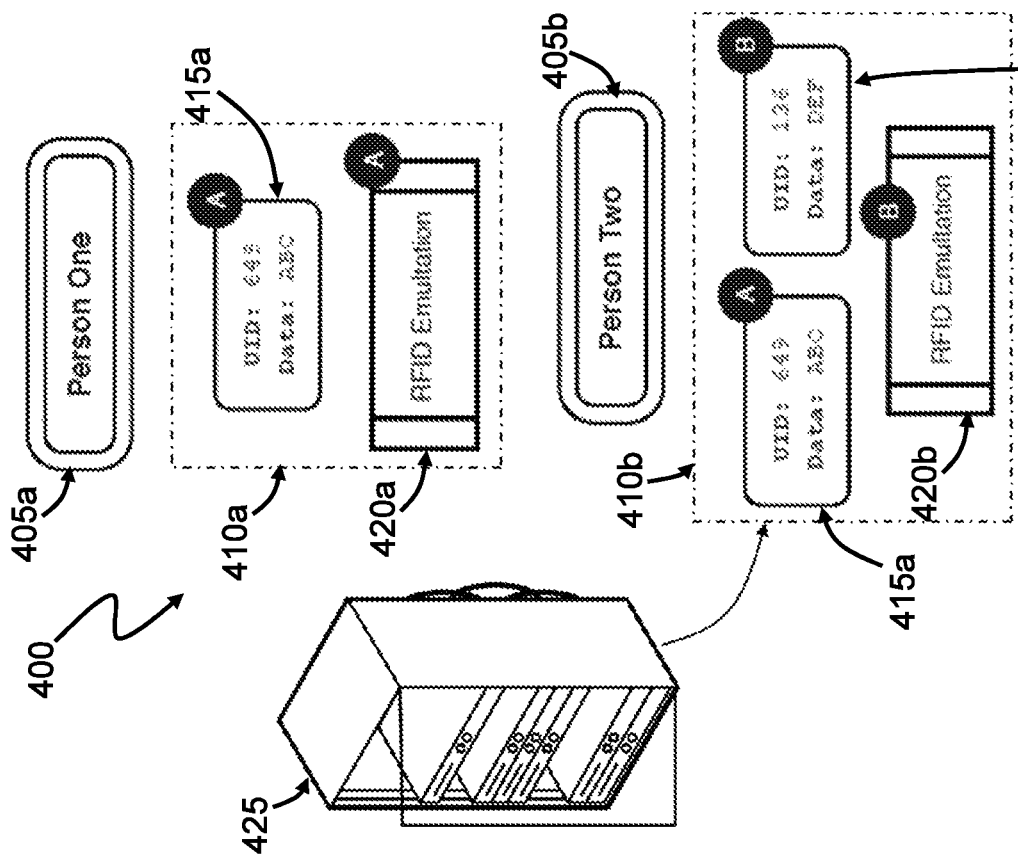
FIG. 4b illustrates the portion of a wireless access system of FIG. 4a in a second configuration.
Figure 4A:
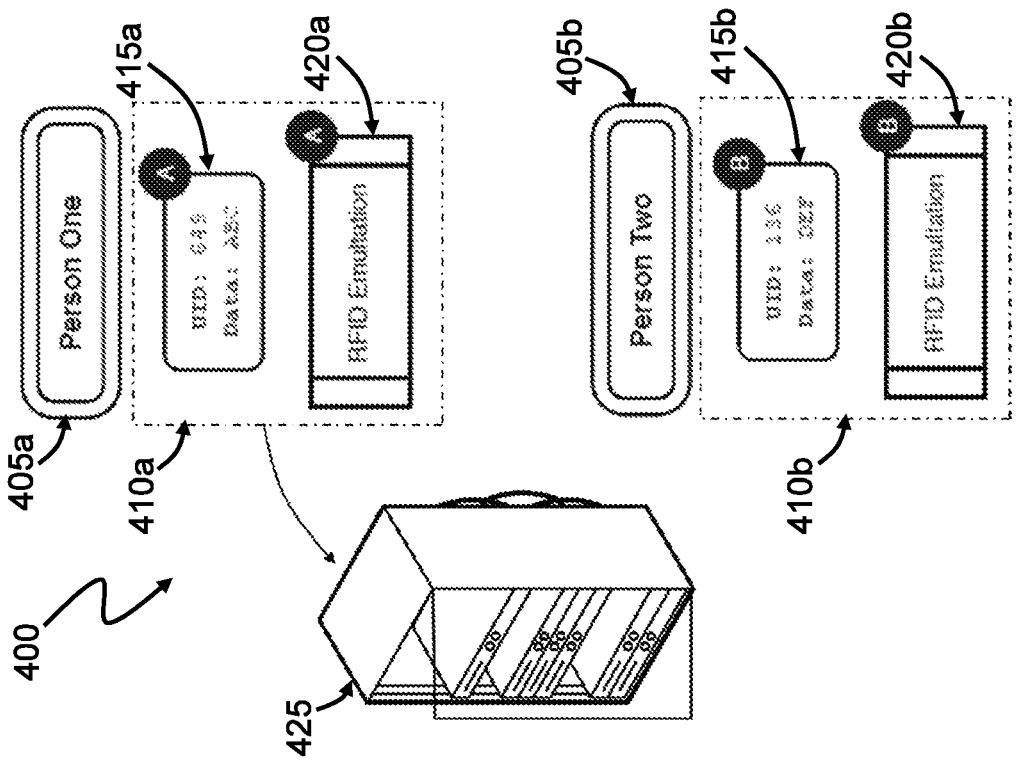
FIG. 4a illustrates a portion of a wireless access system in a first configuration.

As outlined above, the system 100 may be used to share tag data between users, or between devices of different users. FIGS. 4a and 4b below illustrate such scenario.

FIG. 4a illustrates a portion of a wireless access system 400 in a first configuration, including a first user 405a, and their associated device 410a, and a second user 405b, and their associated device 410b. The devices 410a, 410b may be similar or identical to the devices 105 of the system 100.

The first device 410a includes first tag data 415a, and first RFID emulation hardware 420a. The second device 410b includes second tag data 415b, and second RFID emulation hardware 420b. As such, the first and second devices 410a, 410b essentially function as independent RFID tags.

The first user 405a wishes to share his or her first tag data 415a with the second user 405b. The first tag data 415a may correspond to an area which the first user 405a controls, but wishes to provide access thereto to the second user 405b.

This is achieved using a method similar or identical to the method 300, namely that the first device 410a contacts a remote server 425 and sends the tag data to the server 425. The remote server 425 then shares that tag data with the second device 410b.

FIG. 4b illustrates the portion of a wireless access system 400 in a second configuration, namely where the first tag data has been shared with the second device.

In particular, the second user device 410b also performs a method similar or identical to the method 300, namely that the second device 410b contacts the remote server 425 and retrieves the tag data therefrom. The second user device 410*b* is thus updated to include, and is able to use, the first tag data 415*a* on the second RFID emulation hardware 420*b* in the same way the first user device 410*a* does so using the first RFID emulation hardware 420*a*.

The sharing process may be initiated using an online control panel, or by any suitable means. In particular, and as illustrated in FIG. 1, a personal computing device 125 is also coupled to the server 120, which enables users 110*a*-110*n* to share tag details with other users, and otherwise manage their tags online.

While the above examples relate to the sharing of tag data, tags may be revoked at any time using similar means. This may be achieved by removing the tag data from the device, or overwriting the tag data with invalid tag data, for example. This is particularly useful if a device is lost or stolen, as it enables remote erasure of the tags, and without requiring any such functionality to be present in the access control system used.

Depending on the access system used, tag data may not remain static. In particular, as part of an authentication process, the reader may return new data to the tag for future authentication. While this may prevent unauthorised copies of tags being in circulation, this does cause problems for devices sharing a tag, as a lack of synchronisation of this data between cards will cause one of the cards to be rejected.

Figure 5:
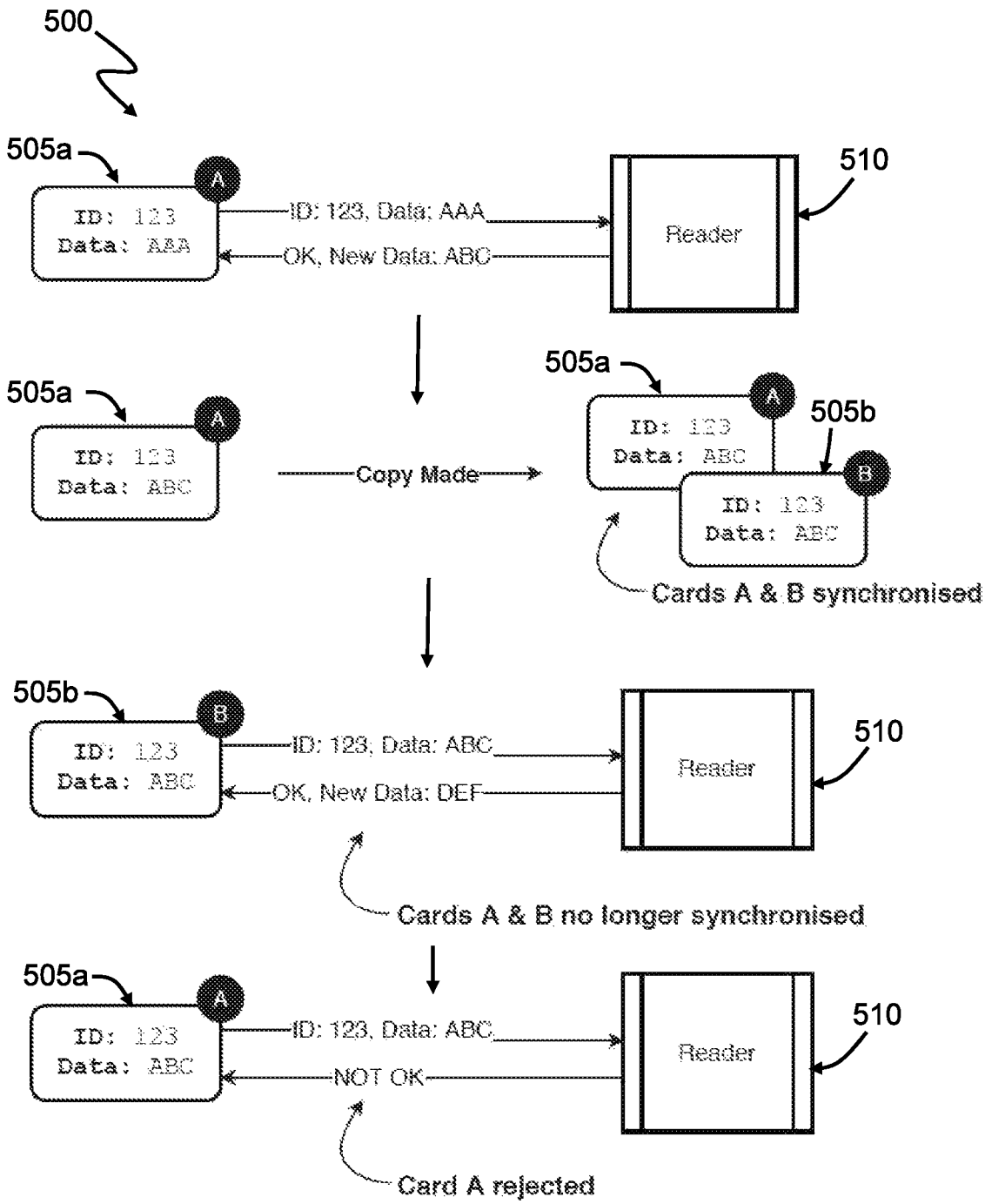
FIG. 5 illustrates a scenario where tag data is duplicated, but the tags lose synchronisation.

FIG. 5 illustrates a scenario 500 where tag data is duplicated, but the tags lose synchronisation, and one of the duplicate tags is ultimately is rejected.

Initially, a first tag 505*a*, which may be similar to the tag 105, authenticates with a reader 510 using its identifier (in this case "123") and its data (e.g. a key, in this case "AAA"). The reader verifies this data responds to the authorisation request with an "OK", and returns new data (in this "ABC"). As such, the data of the first tag 505*a* is updated using the new data.

A copy is then made of the first tag 505*a*, resulting in a second tag 505*b* having the same identifier and data as the first tag 505*a* (in this case "123" and "ABC").

The second tag 505*b* then authenticates with the reader 510 using its identifier (in this case "123") and its data (in this case "ABC"). The reader responds to the authorisation request with an "OK", and returns new data (in this "DEF"). As such, the data of the second tag 505*b* is updated using the new data. At this point the first and second tags 505*a*, 505*b* are no longer synchronised.

The first tag 505*a* then attempts to authenticate with the reader 510 using its identifier (in this case "123") and its data (in this case "ABC"). The reader 510 expects the updated data provided to the second tag 505*b* (i.e. "DEF") and thus responds to the authorisation request with a "NOT OK" message, and as such, the first tag 505*a* is rejected.

As such, the method illustrated in this scenario 500 is not particularly useful in systems where new authentication data (e.g. a key) is returned in response to a successful authentication request.

Figure 6:
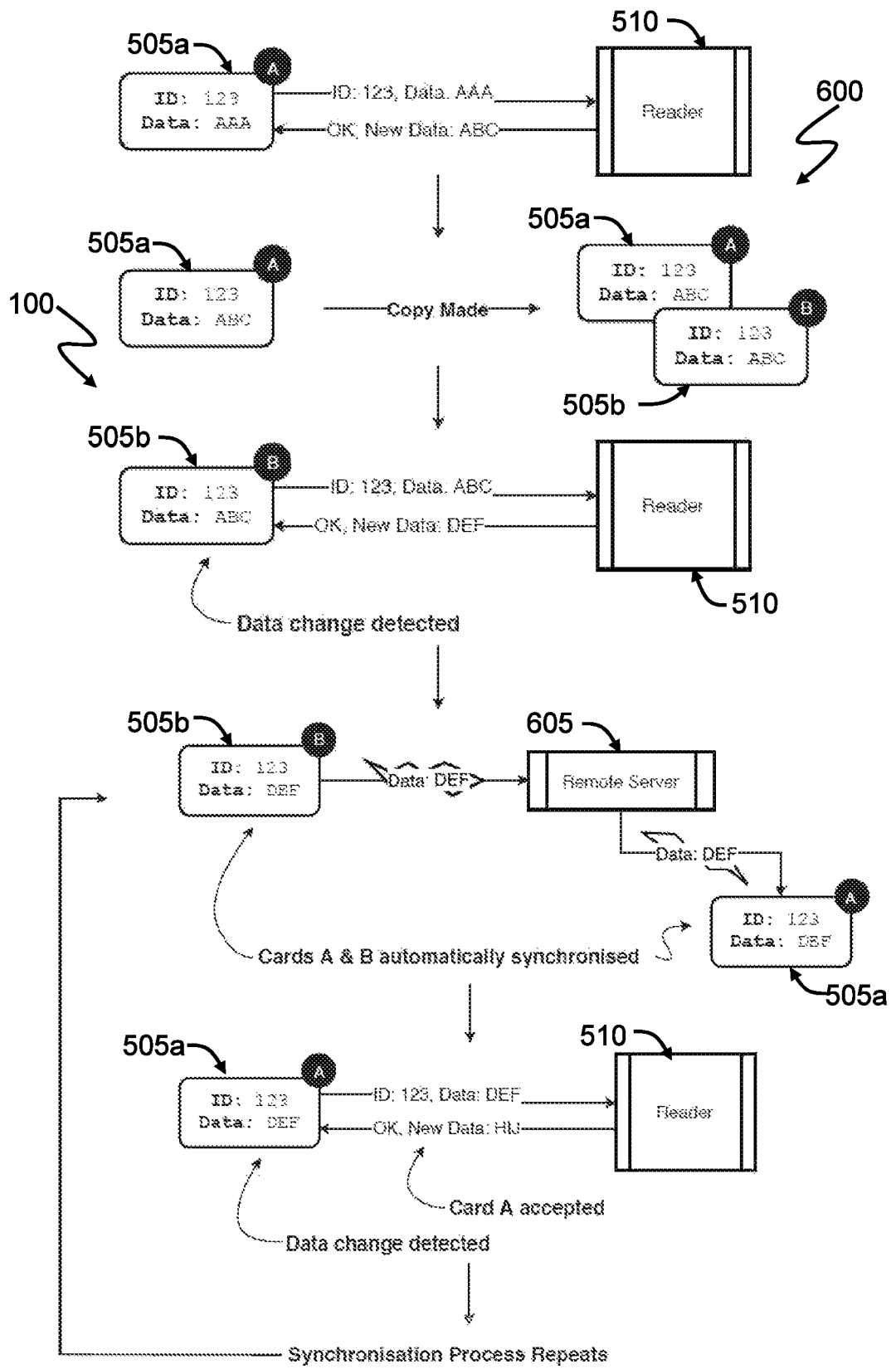
FIG. 6 illustrates a scenario where tag data is duplicated, and the tag data is synchronised.

FIG. 6 illustrates a scenario 600 where tag data is duplicated, and the tag data is synchronised, according to an embodiment of the present invention.

The scenario 600 is similar to the scenario 500 in that the first tag 505*a* authenticates with the reader 510, receives new data, is copied to generate the second tag 505*b*, and the second tag authenticates with the reader.

However, upon receipt of the new data, the second tag 505*b* contacts a remote server 605, which may be similar or identical to the remote server 120. The remote server 120 then updates the first tag 505*a* using the new data, and thus maintains synchronisation between the first and second tags 505*a*, 505*b*.

As such, when the first tag 505*a* then attempts to authenticate with the reader 510, the authentication is successful as the first tag 505*a* performs such authentication using the updated data.

In addition to interacting with the devices using the buttons, in some embodiments the devices may be configured to couple to smartphones, or other external devices, which may be used to interact with the devices. As an illustrative example, an application may be installed on a smartphone which enables the user to interact with the device using a touchscreen of the smartphone, buttons of the smartphone, or a combination thereof.

While the embodiments described above enable new functionality to be added to existing wireless (e.g. RFID) based access systems, without requiring the access system itself to be upgraded, the skilled addressee will readily appreciate that aspects of the system may be useful even in upgraded access systems.

In one embodiment, the access system and tags may be updated simultaneously, and without input from the user. In such case, data (e.g. keys) may be updated on the access system, and one or more tags may be updated wirelessly to include that data. As such, any keys or data in circulation that are not updated will no longer work with the access system. This is in clear contrast to prior art systems where cards must be manually reprogrammed to include such new keys or data.

Furthermore, in addition to synchronising keys or data, communication between the devices 105*a*, 105*n* and the server 120 may be used to provide detailed logging of badge use, including time, date, frequency, location, even if the original access control system does not provide this functionality.

Similarly, communication between the devices 105*a*, 105*n* and the server 120 may be used to localise lost or stolen badges. In particular, location data, which may be obtained directly from the device, may be sent to the server, and then retrieved by a user, using a computing device, for example.

In some embodiments, temporary access passes may be provided using the system 100 for one-time visits, or limited access (e.g. during a particular time window). In particular, a device of a user for whom temporary access is granted may be populated with a tag which provides access to the restricted area when the access is granted, and removed this access when the access is no longer granted. As such, temporary access passes may be created even if the original access control system does not provide this functionality.

Such temporary access passes are particularly useful for short-term rental properties, as cleaning passes, to provide employee tags that only works between specific times, to provide a tag that only works on weekends, or simple when shared tag access is provided for a limited period (e.g. a first user temporarily sharing their access with a peer). As outlined above, there is no need to have physical access to the devices to update the tags, and as such, the process may be entirely seamless to the end user—i.e. when the tag is meant to work it does, and when it is not meant to work it doesn't.

Furthermore, as access can be provided without physical access to the device, in the case of unforeseen circumstances (e.g. a short-term tenant extending their stay), further access can be provided seamlessly.

While the above examples illustrate the updating of the device via a server, the skilled addressee will readily appreciate that the device may emulate all aspects of a normal tag or badge, including reading and writing. As such, the initial data of the device does not necessarily have to come from a server, but instead can be programmed similar to existing cards. In such case, the data may be transmitted by the device to the server, to enable the device to be used with existing tag or badge programming tools.

Advantageously, embodiments of the invention enable duplication and synchronisation of tags in systems that have otherwise been uncopiable, and without jeopardising security. As the tags that are copied are synchronised, even if a further illegitimate copy of one of the tags were made (e.g. skimmed), it would not be synchronised with the original tags, and thus would become useless after one of the legitimate tags is used.

Embodiments of the invention enable limited or unlimited access to be provided to other users in a user-friendly manner. In particular, a visitor's device may automatically retrieve the necessary tag(s) without having to swap or leave keys, or be physically present.

Furthermore, the storage of the tag data on the server provides an efficient and convenient means to backup the tag data, which is particularly useful when a device is lost. In such case, the tag data may be synchronised with another device (e.g. a replacement device).

Embodiments of the invention may also be useful for remote management of a badge fleet as it removes the need for physical access to a badge for updates. Many companies manage large fleets of employee badges, which can only be updated via physical access to the badges (i.e. on-site programming). The systems and methods described above allow these companies to manage their badges remotely, significantly reducing overhead cost, security risk and time spent on management (i.e. enabling off-site programming)

Furthermore, a single device may be used to replaces multiple tags or badges, allowing users to reduce the amount of badges they carry.

Yet further again, new badge emulation technologies can be remotely sent to devices from the server. In particular, the remote server may be used to update the internal firmware of the devices, allowing for new functionality and features to be automatically implemented.

While many of the scenarios described above relate to use of improved devices including tag data, the improved devices may coexist with prior art tags. In such case, users of prior art tags may enjoy limited functionality (as has always been the case), and those using improved devices may enjoy enhanced functionality. As such, the systems described above may be implemented incrementally into existing systems without causing disruption.

While only one reader, one server, and limited numbers of devices are illustrated in the drawings for clarity, the skilled addressee will readily appreciate that complex systems may include large numbers of readers, servers and devices. Each of the readers may operate at a different frequency/protocol, and a single wireless access device may operate at different frequencies and using different protocols according to need.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A wireless access system, comprising:
   a plurality of wireless devices dynamically configurable to emulate as one or more wireless access tags; and
   a remote server configured to selectively provide tag data to the plurality of wireless devices to enable the plurality of wireless devices to emulate the one or more wireless access tags using the selectively provided tag data;
   wherein:
   the one or more wireless access tags are configured to retrieve tag data from the remote server and emulate the one or more wireless tags according to the retrieved tag data; and
   each of the plurality of wireless devices is configured to upload updated tag data to the remote server to enable synchronization of the updated tag data across the plurality of wireless devices.

2. The wireless access system according to claim 1, wherein the plurality of wireless devices are configured to:
   emulate the one or more wireless access tags multiple times; and
   retrieve the tag data prior to each emulation of the wireless access tag.

3. The wireless access system according to claim 1, wherein the tag data includes a tag identifier and one or more keys for use in authentication.

4. The wireless access system according to claim 3, wherein the tag data further includes tag configuration data.

5. The wireless access system according to claim 1, wherein:
   the plurality of wireless devices are configured to emulate the one or more wireless access tags for use with one or more receivers; and
   the plurality of wireless devices are configured to retrieve the tag data independently of the one or more receivers.

6. The wireless access system according to claim 5, wherein;
   the one or more receivers comprise a legacy receiver; and
   emulation functionality is provided using the plurality of wireless devices and the remote server.

7. The wireless access system according to claim 1, wherein;
   the plurality of wireless devices coexist with legacy wireless access tags; and
   the plurality of wireless devices and the legacy wireless access tags are indistinguishable in their interaction with the remote server.

8. The wireless access system according to claim 1, wherein the plurality of wireless devices include first and second devices including the same tag data to enable duplication of one of the one or more wireless access tags on different ones of the plurality of wireless devices.

9. The wireless access system according to claim 8, wherein a first wireless device, of the plurality of wireless devices, is configured to share tag data relating to one or more of the wireless access tags with a second wireless device of the plurality of wireless devices.

10. The wireless access system according to claim 1, wherein the updated tag data comprises tag data received from a receiver in response to authentication with the receiver.

11. The wireless access system according to claim 1, wherein the remote server is configured to selectively remove tag data from one or more of the plurality of wireless devices to provide time-limited access to the one or more of the plurality of wireless devices.

12. The wireless access system according to claim 1, wherein each wireless device of the plurality of wireless devices is configured to store tag data corresponding to a plurality of tags, wherein the tag data is selectable to emulate a respective one of the plurality of tags.

13. The wireless access system according to claim 12, wherein said each wireless device is configured to automatically select a set of tag data, of a plurality of sets of tag data, based on a location or a detected field of a receiver in proximity to said each wireless device.

14. The wireless access system according to claim 1, wherein each of the plurality of wireless devices is further configured to upload logging data relating to tag use.

15. The wireless access system according to claim 14, wherein each of the plurality of wireless devices is further configured to upload location data.

16. The wireless access system according to claim 1, wherein the remote server is configured to:
remotely update tag data on one or more receivers; and
automatically update a plurality of wireless devices according to the updated tag data.

17. The wireless access system according to claim 1, wherein the plurality of wireless devices are configured to emulate RFID tags.

18. The wireless access system according to claim 1, wherein:
a wireless device of the plurality of wireless devices includes first tag data and second tag data;
the first tag data configures the wireless device to operate at a first frequency or protocol; and
the second tag data configures the wireless device to operate at a second frequency or protocol different from the first frequency or protocol.

19. A wireless access method, including:
retrieving, with a wireless device of a plurality of wireless devices, tag data from a remote server; and
in response to retrieving the tag data, emulating, with the wireless device, one or more wireless tags according to the retrieved tag data;
wherein:
the remote server is configured to selectively provide tag data to the plurality of wireless devices to enable the plurality of wireless devices to emulate the one or more wireless tags corresponding to the selectively provided tag data; and
each of the plurality of wireless devices is configured to upload updated tag data to the remote server to enable synchronization of the updated tag data across the plurality of wireless devices.

20. A wireless access device, configured to:
retrieve tag data from a remote server;
in response to retrieving the tag data, emulate one or more wireless tags according to the retrieved tag data; and
upload updated tag data to the remote server to enable synchronization of the updated tag data with one or more other wireless access devices.

* * * * *